Dec. 24, 1963    E. J. HILL    3,115,132
ELBOW RESTRAINT MEANS
Filed Oct. 23, 1961
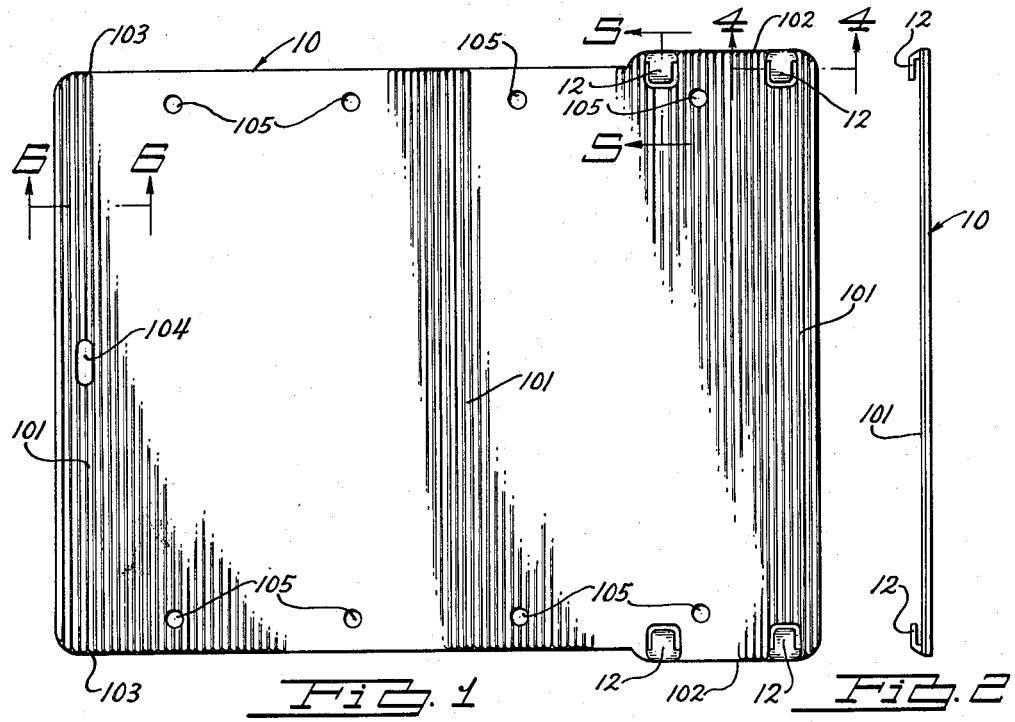
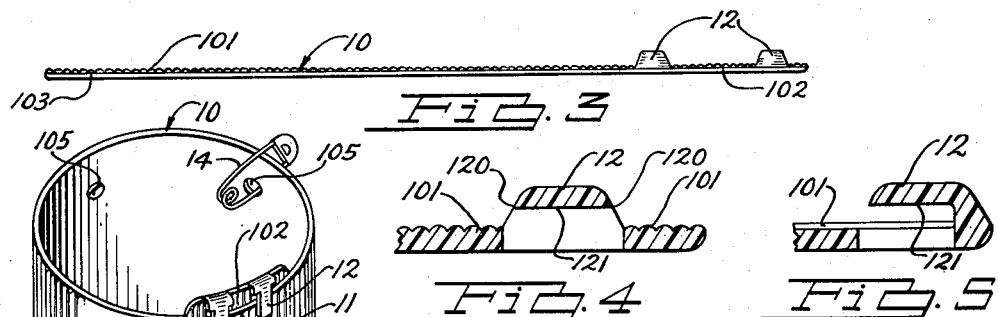
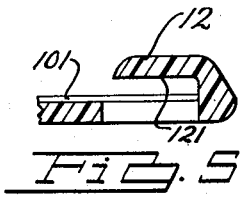
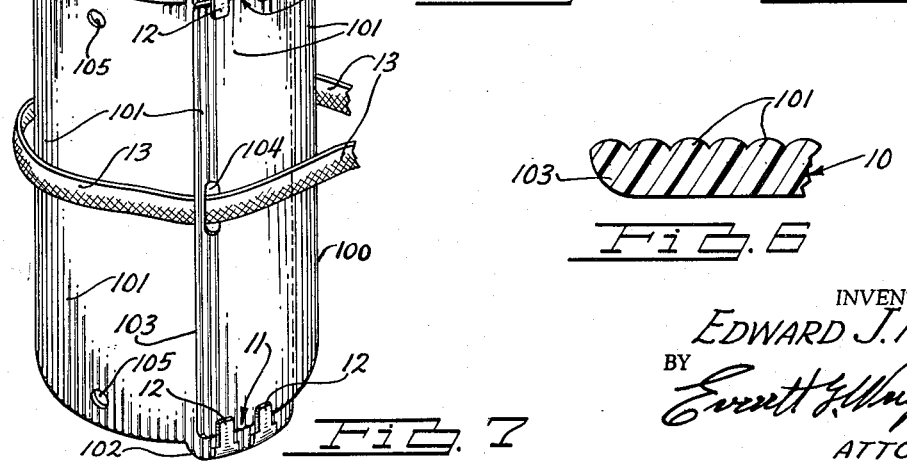
INVENTOR.
EDWARD J. HILL
BY
ATTORNEY United States Patent Office 3,115,132
Patented Dec. 24, 1963

3,115,132
ELBOW RESTRAINT MEANS
Edward J. Hill, 1660 Lochridge, Bloomfield Hills, Mich.
Filed Oct. 23, 1961, Ser. No. 146,729
1 Claim. (Cl. 128—133)

This invention relates to elbow restraint means for children and adult patients useable either when hospitalized or at home and either in bed or ambulatory to prevent or limit the bending of the arm at the elbow.

The primary object of the instant invention is to provide an easily applicable sanitary elbow restraint adapted to be readily sized to a patient's arm for either tight or loose fitting, which can be readily removed and/or adjusted to either a looser or tighter fit as the occasion may require, all with a minimum of discomfort to the patient and within a minimum of time.

Other objects of the invention will become apparent by reference to the following detailed description taken in connection with the accompanying drawing in which:

FIG. 1 is a plan view of an elbow restraint embodying the invention, the upper corrugated type surface being the outside surface when applied to a patient's arm.

FIG. 2 is an end elevational view of the wide end of the elbow restraint.

FIG. 3 is a side elevational view.

FIG. 4 is an enlarged cross sectional view of an alignment slip tab taken on the line 4—4 of FIG. 1.

FIG. 5 is an enlarged longitudinal sectional view of an alignment slip tab taken on the line 5—5 of FIG. 1.

FIG. 6 is a greatly enlarged sectional view taken on the line 6—6 of FIG. 1 showing a preferred free end formation and upper or outside surface corrugations.

FIG. 7 is a view in perspective illustrating the elbow restraint as coiled when applied to a patient, the tying thong being shown disposed through the thong loop but untied.

Referring now to the drawing wherein like reference numerals refer to like and corresponding parts throughout the several views, the particular elbow restraint 10 disclosed for the purpose of illustrating the invention is preferably formed of ribbed plastic sheet of sufficient length to wrap around a patient's arm and overlap at least to the extent illustrated in FIG. 7 and of a width to extend on the patient's arm sufficiently above and below the elbow to prevent bending of the elbow when the elbow restraint is secured in place. Because of the foregoing, elbow restraints embodying the invention are preferably produced in two sizes, one for children, and another for adults.

The plastic sheet out of which the elbow restraint 10 is made is of a relatively stiff rollable plastic sheet which preferably has its outer surface (upper surface as shown in FIG. 1) transversely corrugated or ribbed as at 101. This accomplishes two purposes; first, to provide a relatively rigid sleeve 100 when coiled as shown in FIG. 7, and second, to provide resistance to uncoiling at the slip joints 11 when the elbow restraint is in place. The right hand end portion of the elbow restraint 10 as viewed in FIG. 1 is formed somewhat wider at one end 102 than the remainder thereof to provide support for slip joint tabs 11 into and through which the left hand or narrow end portion 103 of the elbow restraint 10 is telescoped. The narrow end 103 of the elbow restraint 10 has a centrally located tie or thong loop 104 formed therein adjacent the edge thereof. A plurality of safety pin apertures 105 are provided at intervals along both sides of the elbow restraint 10 to permit it to be pinned to the patient's clothing to ensure against accidental longitudinal movement thereof after it has been properly placed over the patient's elbow.

At each side of the wide end portion 102 of the elbow restraint 10 are a pair of spaced hook shaped slip alignment and retention tabs 12 preferably formed as best shown in FIGS. 4 and 5 to accommodate in telescopic relationship the narrow end 103 of the elbow restraint 10. Each hook shaped tab 12 is preferably rectangular in shape as best shown in FIGS. 1 and 5, and has relatively sharp lateral edges 120 each side of a substantial flat area 121 which cooperates with the ribs 101 at the narrow end 103 of the elbow restraint 10 so that it is difficult for the said elbow restraint 10 to slide out from under the said tabs 12 once the said elbow restraint 10 is rolled into a relatively rigid sleeve 100 as best shown in FIG. 7 with the sides of the narrow end 103 of the said elbow restraint 10 telescoped within the said pairs of alignment and retainer tabs 12 at the said slip joints 11 at the wide end 102 thereof.

In other words, the narrow end 103 of the elbow restraint 10 can be manipulated readily in telescopic relationship under the alignment and retainer tabs 12 at the slip joint 11, but thereafter when the elbow restraint has been coiled as shown in FIG. 7, it does not readily slide open or become askew. After the elbow restraint 10 is coiled with the free or narrow end 103 thereof properly disposed within the slip alignment and retainer tabs 12, and the thong 13 is properly tied, the elbow restraint 10 stays in its adjusted diameter and size. One or two safety pins 14 extending through selected safety pin apertures 105 may be employed to anchor the same to the patient's garment or arm bandage, not shown, covering his or her arm, if such anchorage is deemed advisable—which of course would be the case if and when the elbow restraint 10 were loosely rather than tightly applied. Although not shown, two or more thongs 13 may be employed, and if so, the narrow end 103 of the elbow restraint 10 may be provided with a plurality of thong loops 104 instead of one.

The instant invention provides an inexpensive readily and securely applied elbow restraint that stays in place more effectively than prior art devices. It saves doctor's and nurse's time, saves undue manipulation during application to the patient, is sanitary, and is not unduly uncomfortable to the patient.

Although but a single embodiment of the invention has been disclosed and described in detail, it is obvious that many changes may be made in the size, shape, arrangement and details of the illustrative embodiment of the invention, all without departing from the spirit and scope of the invention as defined by the appended claim.

I claim:

An elbow restraint comprising a relatively stiff plastic sheet somewhat wider at one end than at the other, the said plastic sheet being transversely ribbed on one surface permitting said sheet to be readily coiled, the said ribs extending outside and longitudinally of the said elbow restraint when coiled for use, a pair of longitudinally spaced inwardly facing open hook shaped slip joint tabs at the sides of said plastic sheet at the wide end thereof formed with a substantial flat area parallel and closely adjacent the ribbed surface thereof to telescopingly receive the narrow end of said plastic sheet in slip joint relationship when said elbow restraint is coiled for use, and thong means extending through the narrow end of said elbow restraint and encircling the same for securing it in its coiled slip jointed position.

References Cited in the file of this patent

UNITED STATES PATENTS

| | | |
|---|---|---|
| 423,976 | Woolsey | Mar. 25, 1890 |
| 990,280 | Maynard | Apr. 25, 1911 |
| 1,452,998 | Bowers | Apr. 24, 1923 |
| 2,043,153 | Cox | June 2, 1936 |
| 2,188,787 | Keener | Jan. 30, 1940 |
| 2,495,029 | Spengler | Jan. 17, 1950 |
| 2,704,069 | Donelan | Mar. 15, 1955 |
| 2,843,118 | Pelow | July 15, 1958 |